United States Patent [19]

Curtis

[11] Patent Number: 4,857,130
[45] Date of Patent: Aug. 15, 1989

[54] TEMPERATURE STABLE OPTICAL BONDING METHOD AND APPARATUS OBTAINED THEREBY

[75] Inventor: Daniel L. Curtis, Manhattan Beach, Calif.

[73] Assignee: Hughes Aircraft Company, Los Angeles, Calif.

[21] Appl. No.: 128,372

[22] Filed: Dec. 3, 1987

[51] Int. Cl.⁴ .............................................. B32B 31/04
[52] U.S. Cl. ..................................... 156/292; 156/84; 156/85; 156/295; 156/349
[58] Field of Search .................... 156/85, 99, 103, 292, 156/295, 84, 349

[56] References Cited

U.S. PATENT DOCUMENTS 4,724,023  2/1988  Marriott .......................... 156/103 X

OTHER PUBLICATIONS

William C. Ware, *Adhesion and the Formulation of Adhesives*, (2 Ed.), London: 1982, pp. 122-124.

Primary Examiner—Robert A. Dawson
Attorney, Agent, or Firm—William J. Streeter; A. W. Karambelas

[57] ABSTRACT

An optical element (10) is bonded to a support (12) by a resilient bonding agent (20). The bonding agent has the property of shrinking upon curing. It is placed within a bonding space (18) defined by rails (14, 16). Upon curing, the bonding agent shrinks and securely pulls the element against top surfaces (14a, 16a) of the rails under tension of the bonding agent.

18 Claims, 2 Drawing Sheets

TEMPERATURE STABLE OPTICAL BONDING METHOD AND APPARATUS OBTAINED THEREBY

BACKGROUND OF THE INVENTION

The present invention relates to an apparatus and method for bonding optical element to a support and, more particularly, to such bonding which is unaffected by any differential coefficients of thermal expansion of the optical element, the support and the material bonding the element to the support.

Optical glass and like optical elements are conventionally bonded to a support by bonding materials. Typical bonding materials have a coefficient of thermal expansion which is approximately ten times higher than that of the optical element or the substrate to which the element is bonded. As a consequence, temperature changes cause differential expansion of the bond and thereby results in optical shifts in the optical element. In addition, if the bond interface is not exactly uniform in thickness, the thicker part expands more than the thinner part, to create a wedge which results further in an optical shift.

Sometimes, even if the bond thicknesses are made precisely uniform throughout the bonding area, the bonding material buckles, which causes the optical element to tilt with respect to its support, and produce an optical shift.

Such thermally induced optical shifts are highly undesirable as causing optical misalignment in precise optical equipment.

One common method of minimizing such optical shifts and optical misalignment requires the selection of bonding materials which tend to minimize such shifts. In addition, the bond thickness is made as small as possible so that its effect is minimized. Finally, some techniques employ a boresight maneuver immediately prior to use of the equipment first to measure the optical shift and then to correct it either electronically or physically by tilting mirrors, in order that the optical shift be nulled out. Such approaches significantly affect the overall cost and complexity of the system.

An additional problem occurs when a system includes two or more optical elements, for example, prisms, which are to be aligned one with respect to the other. Positioning of such multiple image prisms requires that each prism be positioned precisely with respect to other prisms. Conventionally, this requires some form of support and the attendant bonding of the prisms thereto. Such bonding techniques, such as referred to above, create difficulties in precise alignment. Typically, the prisms are aligned one with respect to the other in a holding fixture that includes supporting the prism frame. Once the prisms are correctly positioned with respect to the frame, the bonding material is used to bond the prisms to the support structure. Because the prism surfaces are not necessarily parallel to the walls of the frame, the bond thickness will vary over the bond area, with the result that the prism alignment shifts with temperature as a result of the wedge and temperature buckling effects.

SUMMARY OF THE INVENTION

The present invention avoids and overcomes these and other problems by use of spaced rails on the support. The optical element rests firmly on the rails and is bonded to its support by a resilient bonding agent, such as an epoxy placed between the rails. The bonding agent is selected to have the property of shrinking upon curing, and is bonded directly to the optical element and the support. Thus, the bonding agent not only bonds the optical element to the support but securely pulls the element into direct contact against the rails under tension of the agent. Therefore, the rails provide a precise, determinable spacing between the optical element and the support.

The rails may comprise two or more straight or curved risers, or a pan-like arrangement. The latter pan like arrangement can serve also as an intermediary attachment to a frame, with further bonding material securing the pans to the frame. When pans are secured to two or more optical elements, the optical elements may be positioned with precise optical alignment with respect to each other in the same frame.

Several advantages are derived from the above construction. Optical elements are bonded to their support without misalignment resulting from temperature changes. A plurality of optical elements may be positioned precisely with respect to one another, without regard to any misalignments of their supporting frames.

Other aims and advantages, as well as a more complete understanding of the present invention, will appear from the following explanation of exemplary embodiments and the accompanying drawings thereof.

DETAILED DESCRIPTION OF THE INVENTION

Figure 1:
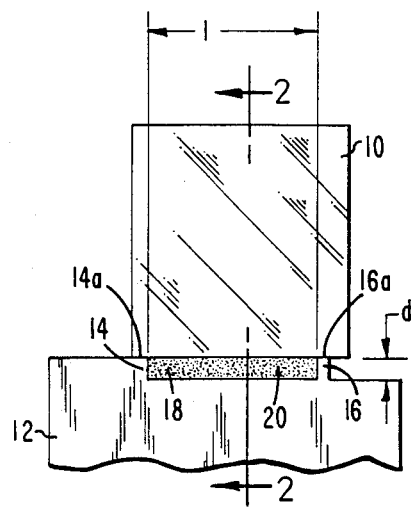
FIG. 1 illustrates one embodiment of present invention utilizing parallel rails.
Figure 2:
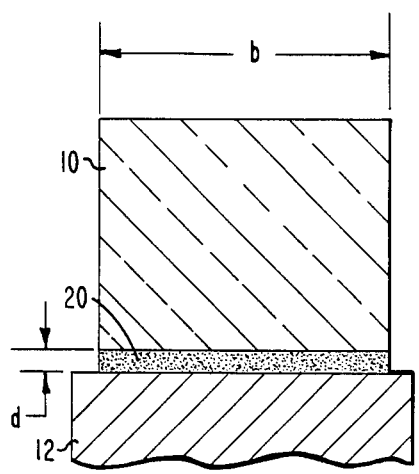
FIG. 2 is a view taken along line 2—2 of FIG. 1.

As shown in FIGS. 1 and 2, an optical element 10 is bonded to a support 12. The support is provided with a pair of parallel rails 14 and 16 which are machined or otherwise formed in the support to provide top surfaces 14a and 14b. The rails are open at both ends, as depicted in FIG. 2. As illustrated, rail 14 is considerably wider than rail 16; however, this is not necessary. The rails are spaced from one another to provide a bonding space 18 therebetween of width 1 and height d. Placed within bonding space 18 is a bonding agent 20 whose only requirements are that it have a capability of being bonded securely to element 10 and support 12 and have the property of shrinking upon curing. Examples of such bonding agents include elastomeric epoxy, polysulfide and polyurethane adhesives. The particular elastomer is selected in part to remain effective within the environment and temperature range of use.

In operation, bonding agent 20 shrinks about 5% in curing. This shrinkage causes optical element 10 to be pulled against and in direct contact with top surfaces 14a and 16a of rails 14 and 16 under tension of the agent. Thus, a positive force is always present for the full range of environmental temperatures.

Application of the bonding agent requires that the surfaces of element 10 and substrate 12 be cleaned to permit bonding of agent 20 thereto. Thereafter, the element is first positioned on one of the rails using a suitable positioning/holding fixture. The bonding agent is then introduced into the bonding space through fill holes (see FIGS. 3-6) or an opening (FIGS. 1 and 2) at one end of the bonding space. Because of the open ended construction at, at least, one end of the rails, excess bond material is free to exit the assembly at the ends. Alternatively, witness holes (see FIGS. 3-6) either in the support or through the rails may be used to provide a fixed bond area as limited by the position of the witness holes. The size of the bonding space needs only be as large as is practical to maximize the holding force. It is also important that no bonding material enter between the rails and the optical element.

In addition, to ensure that no undue stresses be applied to the optical element and thereby distort it, support 12 may be relieved between or adjacent rails 14 and 16 so that any stresses will cause a bending of the support rather than of the optical element.

Figure 3:
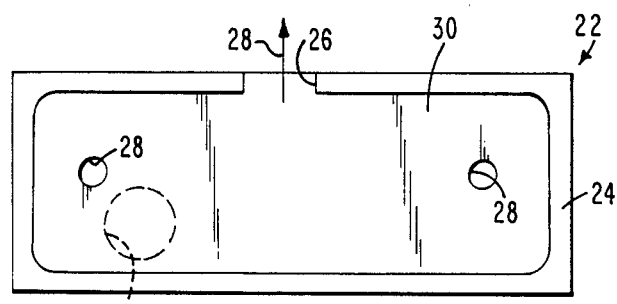
FIGS. 3 and 4 depict two further embodiments of the present invention, with FIG. 4 illustrating an improvement to avoid a potential problem in the FIG. 3 embodiment.

A further embodiment is depicted in FIG. 3 in which a rail configuration 22 comprises a plurality of rails 24 formed in an rectangular configuration, with an exit opening 26 formed in one of the sides. A pair of fill holes 28 extend through a support 30 and force the bonding agent through opening 26 as indicated by arrow 32. The use of fill holes and an opening must be designed to avoid the entrapment of air bubbles, such as indicated by indicium 34; therefore, the arrangement is FIG. 3 is less desired than that shown in FIG. 4. However, such air bubbles may be avoided also by care in inserting the bonding agent.

Figure 4:
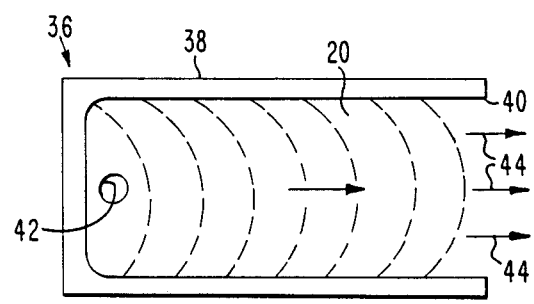

FIG. 4 illustrates an embodiment, improved over that of FIG. 3, in which a rail configuration 36 comprises three rails 38 having a general U-shaped configuration with an opening 40 at one end and a fill hole 42 at the other end. This rail construction permits bonding agent 20 to flow in the direction of arrows 44, and is effective to eliminate air bubbles.

The embodiments depicted in FIGS. 1-4 may be limited to where the optical element bonding surface is required to be parallel to the surface of the support structure. Some applications use a multiplicity of optical structures, e.g., multiple image prisms, and require that the prisms be precisely positioned with respect to each other and to their support structure before bonding. For example, in a full prism assembly comprising two or more optical elements, one prism is aligned with respect to the other in a holding fixture that includes supporting the prism frame.

Figure 5:
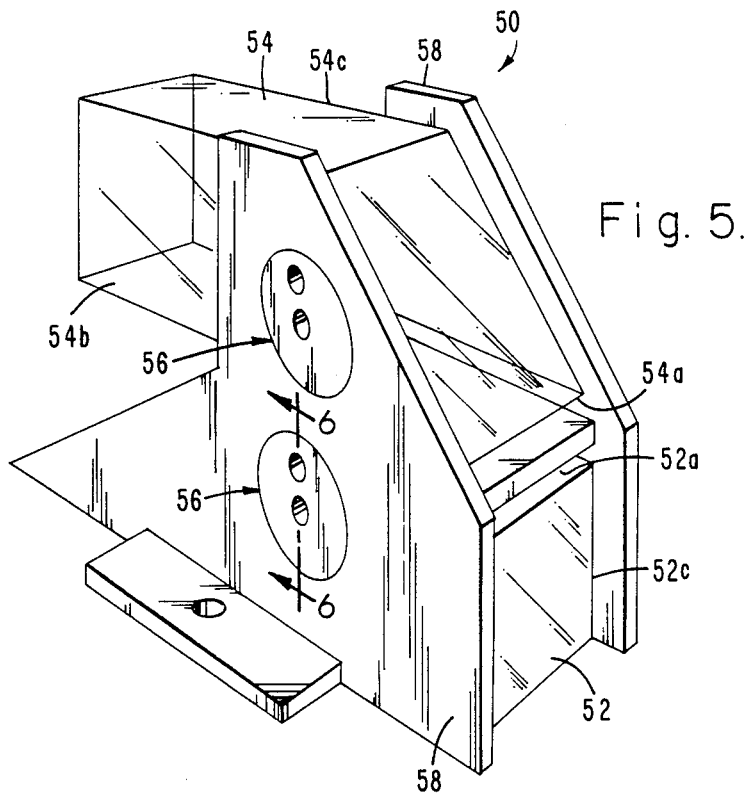
FIG. 5 illustrates a precise alignment of two prisms.
Figure 6:
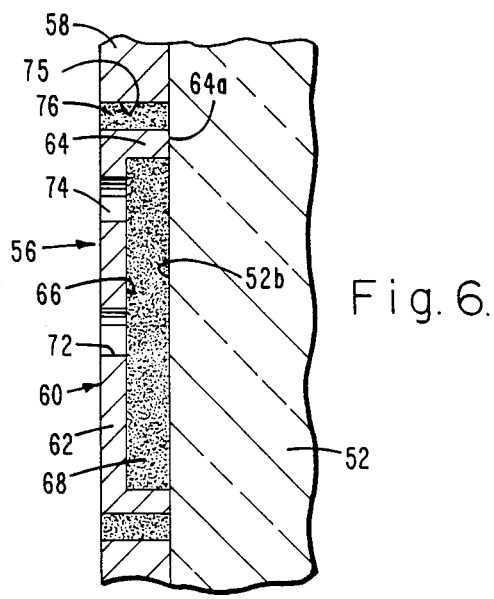
FIG. 6 is a view of the embodiment shown in FIG. 5 taken along line 6—6 thereof.

The embodiment illustrated in FIGS. 5 and 6, which depict a prism assembly 50, solves this problem. A pair of prisms 52 and 54 are positioned so that their respective faces 52a and 54a are positioned adjacent to one another in proper optical alignment. To provide for such an optical alignment, a pair of rail configurations 56, one on each side 52b and 54b respectively of prisms 52 and 54, are used to secure the prisms to supports 58. Only one set of configurations 56 per prism is shown in FIG. 5; similar sets secure other sides 52c and 54c to their respective support.

As best seen in FIG. 6, each rail configuration 56 comprises a pan 60 having a base 62 and rails 64 configured in a circular peripheral pattern to provide an abutment rail top surface 64a. It is to be understood, however, that pan 60 may be of any configuration and rails 64 may be otherwise curved or polygonally configured, whether continuous or segmented. Regardless of the specific configuration, a bonding space 66 is provided into which a bonding agent 68 is inserted to bond side 52b of element 52 to base 62 of the pan. As in the embodiments shown in FIGS. 1-4, bonding agent 68 shrinks upon curing to tightly cause element side 60 to firmly abut against top surface 64a of rails 64. Bonding agent 68 may be inserted through a fill hole 72. A witness hole 74 is provided for extrusion of any excess bonding material.

Pan 60 is bonded to its support 58 by means of a second bonding agent 76, such as a rigid epoxy, which cements the pan within a hole 75 formed in the support.

Rail configuration 56, therefore, acts as an adjustable plug between prism surface 52b and supporting wall 58, and rail configuration 56 is bonded both to optical element 52 or 54 and in place within mating hole 75 in support 58. This use of rail configuration 56 with a separate, in place bond, allows non parallelism to exist between the optical bonding surface and its mating support structure surface, while retaining all the advantages of the invention.

One procedure for assembling the embodiment of FIGS. 5 and 6 may encompass the following steps. First, each optical element 52 and 54 is aligned using a bonding fixture. Second, each pan 60 is coated on its outer edge with a rigid structural adhesive so that, when the pan is inserted into its mating hole 75, the excess adhesive is left on the hole rim where it can be removed by wiping. Residual amounts of the adhesive, e.g., several thousandths of an inch, is left between the pan wall and the inner diameter of hole 75 so that, when set, it rigidly holds pan 60 to supports 58. Third, pan 60 is fully inserted so that it contacts its side 52b, 52c, 54b and 54c respectively of the optical elements. Fourth, clamps are positioned to enable the pans to be rigidly held against their optical elements. Fifth, adhesive is then added within bonding space 66 through fill hole 72 until the pan is completely filled, as evidenced by adhesive reaching witness hole 74. Sixth, both the witness and fill holes are cleaned of adhesive. Seventh, the unit is allowed to air cure for the requisite curing time, such as for 24 hours minimum. Eighth, after removing the assembly from the bonding fixture, but leaving the plug clamps in place, the entire unit is then oven cured for the requisite minimum time, for example, for a minimum of 6 hours at 150° F. Ninth, after removing the assembly from the oven, the plug clamps are removed and the fill and witness holes are again cleaned out, to prevent any temperature expansion of the epoxy or other bonding agent in the holes which otherwise itself would cause optical shifts. Tenth, the alignment is checked to ensure that the assembly has been correctly made, and without any optical shift.

Although the invention has been described with respect to particular embodiments thereof, it should be realized that various changes and modifications may be made therein without departing from the spirit and scope of the invention.

What is claimed is:

1. In a bonding of an optical element to a support, the improvement comprising:
spaced rails on and extending from the support and supporting the optical element; and
a resilient bonding agent, having the property of shrinking upon curing, bonding the optical element to the support and securely pulling the element against said rails under tension of the agent.

2. In a bonding of an optical element to a support, the improvement comprising:
spaced rails on the support;
a resilient bonding agent, having the property of shrinking upon curing, bonding the optical element to the support and securely pulling the element against said rails under tension of the agent; and
means defining a relief in the support adjacent said rails for causing any bending stresses incurred by said bonding agent to be applied to the support rather than to the optical element.

3. The improvement according to claim 1 further comprising a bonding space positioned between said rails and defined at least by the height of said rails and the space therebetween.

4. In a bonding of an optical element to a support, the improvement comprising:
spaced rails on the support;
a resilient bonding agent, having the property of shrinking upon curing, bonding the optical element to the support and securely pulling the element against said rails under tension of the agent;
a pan having a base with said rails extending therefrom and with said bonding agent bonding the element to said rails; and
a second bonding agent bonding said pan to the support.

5. An arrangement for bonding an optical element at its sides to a pair of walls, comprising:
a pair of pans, each having a base and rails extending therefrom;
a resilient bonding agent, having the property of shrinking upon curing, respectively bonding the optical element sides to said bases of said pans and securely pulling the element sides against said rails of said pans under tension of the agent; and
a second bonding agent bonding said pans respectively to the walls.

6. The improvement according to claim 5 in which each of said pans have an exterior configuration, and further comprising means defining openings in the walls generally configured as said pan configuration for enabling said pans to fit within said opening means and said element to be bonded to the walls regardless of whether or not the walls are parallel to one another.

7. An arrangement for bonding a pair of optical elements at their respective sides to a pair of walls and thereby for positioning one with respect to the other, comprising:
a pair of pans, each having a base and rails extending therefrom;
a resilient bonding agent, having the property of shrinking upon curing, respectively bonding the optical element sides to said bases of said pans and securely pulling the element sides against said rails of said pans under tension of the agent; and
a second bonding agent bonding said pans respectively to the walls.

8. The improvement according to claim 5 in which each of said pans has an exterior configuration, and further comprising means defining openings in the walls generally configured as said pan configuration for enabling said pans to fit within said opening means and the element to be bonded to the walls regardless of whether or not the walls are parallel to one another.

9. A method for bonding an optical element to a support comprising the steps of:
forming spaced rails on the support as extensions thereof;
placing the optical element on the rails; and
bonding the optical element to the support by a resilient bonding agent having the property of shrinking upon curing for securely pulling the element under tension of the agent against the rails.

10. A method for bonding an optical element to a support comprising the steps of:
formed spaced rails on the support;
bonding the optical element to the support by a resilient bonding agent having the property of shrinking upon curing for securely pulling the element under tension of the agent against the rails; and
relieving the support adjacent the rails for causing any bending stresses incurred by the bonding agent to be applied to the support rather than to the optical element.

11. A method according to claim 9 further comprising the steps of forming a bonding space between the rails defined at least by the height of the rails and the space therebetween.

12. A method for bonding an optical element to a support comprising the steps of:
forming spaced rails on the support;
placing the optical element on the rails;
bonding the optical element to the support by a resilient bonding agent having the property of shrinking upon curing for securely pulling the element under tension of the agent against the rails; and
forming a bonding space between the rails defined at least by the height of the rails and the space therebetween.

13. A method according to claim 12 further comprising the step of placing at least one witness hole in the support and/or one opening through the rails, and in which said bonding step comprises the steps of introducing the bonding agent in its uncured state into the bonding space through at least one fill hole distanced from the witness hole and/or opening for enabling the bonding agent to flow thereto, and thereafter curing the uncured bonding agent.

14. A method for bonding an optical element to a support comprising the steps of:
forming spaced rails on the support by utilizing a pan having a base with the rails extending therefrom and fill and witness holes spaced from one another and extending through the base;
bonding the optical element to the support by a resilient bonding agent having the property of shrinking upon curing for securely pulling the element under tension of the agent against the rails; and
forming a bonding space between the rails defined at least by the height of the rails and the space therebetween.

15. A method for bonding an optical element at its sides to a pair of walls, comprising the steps of:
utilizing a pair of pans, each having a base and rails extending therefrom;
respectively bonding the optical element sides to the bases of the pans by a resilient bonding agent, having the property of shrinking upon curing, and securely pulling the element sides against the rails of the pans under tension of the agent; and
bonding the pans respectively to the walls by a second bonding agent.

16. A method according to claim 15 in which each of the pans have an exterior configuration, and further comprising the steps of forming openings in the walls generally configured as the pan configuration for enabling the pans to fit within the openings and the element to be bonded to the walls regardless of whether the walls are parallel to one another.

17. A method for bonding a pair of optical elements at their respective sides to a pair of walls and thereby for positioning one with respect to the other, comprising the steps of:

utilizing a pair of pans, each having a base and rails extending therefrom;

respectively bonding the optical element sides to the bases of the pans by a resilient bonding agent, having the property of shrinking upon curing, and securely pulling the element sides against the rails of the pans under tension of the agent; and bonding the pans respectively to the walls by a second bonding agent.

18. The improvement according to claim 17 in which each of the pans have an exterior configuration, and further comprising the steps of providing means defining openings in the walls generally configured as the pan configuration for enabling the pans to fit within the opening means and the element to be bonded to the walls regardless of whether the walls are parallel to one another.

* * * * *